(12) United States Patent
Souden et al.

(10) Patent No.: US 12,141,347 B1
(45) Date of Patent: Nov. 12, 2024

(54) MACHINE LEARNING AND USER DRIVEN SELECTIVE HEARING

(71) Applicant: Apple Inc., Cupertino, CA (US)

(72) Inventors: Mehrez Souden, Los Angeles, CA (US); Symeon Delikaris Manias, Los Angeles, CA (US); Ante Jukic, Culver City, CA (US); John Woodruff, Santa Cruz, CA (US); Joshua D. Atkins, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/055,600

(22) Filed: Nov. 15, 2022

Related U.S. Application Data (60) Provisional application No. 63/281,291, filed on Nov. 19, 2021.

(51) Int. Cl.
*G06F 3/01* (2006.01)
*G10L 15/16* (2006.01)
*G10L 15/24* (2013.01)

(52) U.S. Cl.
CPC .............. *G06F 3/013* (2013.01); *G10L 15/16* (2013.01); *G10L 15/24* (2013.01)

(58) Field of Classification Search
CPC .......... G06F 3/013; G10L 15/16; G10L 15/24
See application file for complete search history.

(56) References Cited

U.S. PATENT DOCUMENTS

| | | | |
|---|---|---|---|
| 10,194,259 B1* | 1/2019 | Martin | H04W 4/027 |
| 10,235,808 B2* | 3/2019 | Chen | G02B 27/0172 |
| 10,509,466 B1* | 12/2019 | Miller | H04N 23/55 |
| 10,555,106 B1* | 2/2020 | Mehra | G06F 3/165 |
| 10,602,300 B1* | 3/2020 | Lyren | G06F 3/011 |
| 10,841,724 B1* | 11/2020 | Tran | G06F 3/013 |
| 11,388,513 B1* | 7/2022 | Carlile | H04R 1/1041 |
| 11,765,502 B2* | 9/2023 | Carlile | G10L 25/51 |
| | | | 381/74 |
| 2013/0236040 A1* | 9/2013 | Crawford | H04S 7/306 |
| | | | 381/310 |
| 2016/0080874 A1* | 3/2016 | Fullam | G06F 3/013 |
| | | | 381/313 |
| 2017/0061953 A1* | 3/2017 | An | G10K 11/34 |
| 2019/0187954 A1* | 6/2019 | Cricri | G06F 3/011 |
| 2019/0293609 A1* | 9/2019 | Oh | G01S 15/89 |
| 2019/0394602 A1* | 12/2019 | Moore | H04S 7/305 |
| 2020/0387221 A1* | 12/2020 | Ratcliff | G06F 3/167 |
| 2021/0044882 A1* | 2/2021 | Jain | G10K 11/178 |
| 2021/0055367 A1* | 2/2021 | Poore | G01S 3/8083 |
| 2021/0109585 A1* | 4/2021 | Fleming | G10L 15/1815 |

(Continued)

*Primary Examiner* — William Lu
(74) *Attorney, Agent, or Firm* — Aikin & Gallant, LLP (57) ABSTRACT

An audio processing device may generate a plurality of microphone signals from a plurality of microphones of the audio processing device. The audio processing device may determine a gaze of a user who is wearing a playback device that is separate from the audio processing device, the gaze of the user being determined relative to the audio processing device. The audio processing device may extract speech that correlates to the gaze of the user, from the plurality of microphone signals of the audio processing device by applying the plurality of microphone signals of the audio processing device and the gaze of the user to a machine learning model. The extracted speech may be played to the user through the playback device.

20 Claims, 8 Drawing Sheets

(56) References Cited

U.S. PATENT DOCUMENTS

| | | | |
|---|---|---|---|
| 2021/0168498 A1* | 6/2021 | Zhang | H04R 3/12 |
| 2022/0026531 A1* | 1/2022 | Wu | G01S 13/88 |
| 2022/0122606 A1* | 4/2022 | Kamkar-Parsi | H04R 25/554 |
| 2022/0236795 A1* | 7/2022 | Jonker | G06F 3/011 |
| 2022/0270629 A1* | 8/2022 | Avendano | G10L 21/028 |
| 2022/0377457 A1* | 11/2022 | Carlile | H04R 1/1016 |
| 2023/0043585 A1* | 2/2023 | Golard | A61B 8/10 |
| 2023/0164508 A1* | 5/2023 | Shin | G06F 3/165 |
| | | | 381/303 |

* cited by examiner

FIG. 8 ant Patent Application No. 63/281,291 filed Nov. 19, 2021, which is incorporated by reference herein in its entirety.

MACHINE LEARNING AND USER DRIVEN SELECTIVE HEARING

CROSS-REFERENCE TO RELATED APPLICATION

This application claims the benefit of U.S. Provisional Patent Application No. 63/281,291 filed Nov. 19, 2021, which is incorporated by reference herein in its entirety.

BACKGROUND

Electronic devices can have microphones that sense sounds in a user's environment. Electronic playback devices, such as headphones, can have speakers that convert audio channels to sound. Audio content can be played to a user in a listening environment through speakers of the playback device. Electronic devices that are physically unconnected can communicate with each other over a wired or wireless communication channel.

SUMMARY

Electronic devices can work together to provide an improved audio experience for a user. A user who is wearing a playback device may turn to face a sound source, such as another person. The user's head pose may be tracked by the playback device. A second device may be placed near the user and the sound source, such as in the same room. The second device may have microphones that pick up sounds from the sound source, such as speech of the other person. The second device may process microphone signals generated by its microphones, in a manner that focuses on the region in which the user is facing, to extract the speech in that direction. The user's head position may be determined relative to the second device, so that the sound can be extracted from the microphone signals of the second device to account for the geometry of the microphone array of the second device relative to the user's gaze.

In one aspect, a method may be performed by an audio capture device. The audio capture device can have a plurality of microphones that generate a plurality of microphone signals. The device can determine a gaze of a user who is wearing a playback device. The playback device can be separate from the audio capture device. For example, the playback device can be a wearable playback device such as, for example, a headphone set, a head mounted display, or other wearable playback device. The audio capture device can be a smart phone, a television, a smart speaker, a desktop or laptop computer, or other audio capture device. The gaze of the user may be determined relative to the audio capture device. The audio capture device may extract speech that correlates to the gaze of the user, from the plurality of microphone signals of the audio capture device by applying the plurality of microphone signals of the audio capture device and the gaze of the user to a machine learning model. The audio capture device may send the extracted speech to the playback device for playback. The audio capture device may be a stationary device or a device that is not worn on a user.

In such a manner, the audio capture device, which may be understood as a companion device, can help the playback device sense some sounds, like speech, more intelligibly. The head pose is tracked using the wearable playback device. The user's tracked head pose is used to inform a machine learning model of the direction where the user is looking which is used to indicate an area of interest to the user. The machine learning model can process the microphone signals and extract speech in that area of interest while filtering out or ignoring other sounds from other areas in the user's environment. This speech can be streamed back to the user for playback through the wearable playback device, or another playback device.

In one aspect, a method may be performed by a head-worn playback device. The head-worn device may be configured to obtain binaural audio channels containing speech from an audio capture device that is separate from the head-worn playback device. The binaural audio channels may be generated by operations including determining a gaze of a user who is wearing the head-worn playback device, the gaze of the user being determined relative to the audio capture device; extracting the speech that correlates to the gaze of the user, from plurality of microphone signals of the audio capture device by applying the plurality of microphone signals of the audio capture device and the gaze of the user to a machine learning model; and spatially rendering the extracted speech with head related transfer functions to generate the binaural audio channels. The operations can be distributed between the head-worn playback device and the audio capture device.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
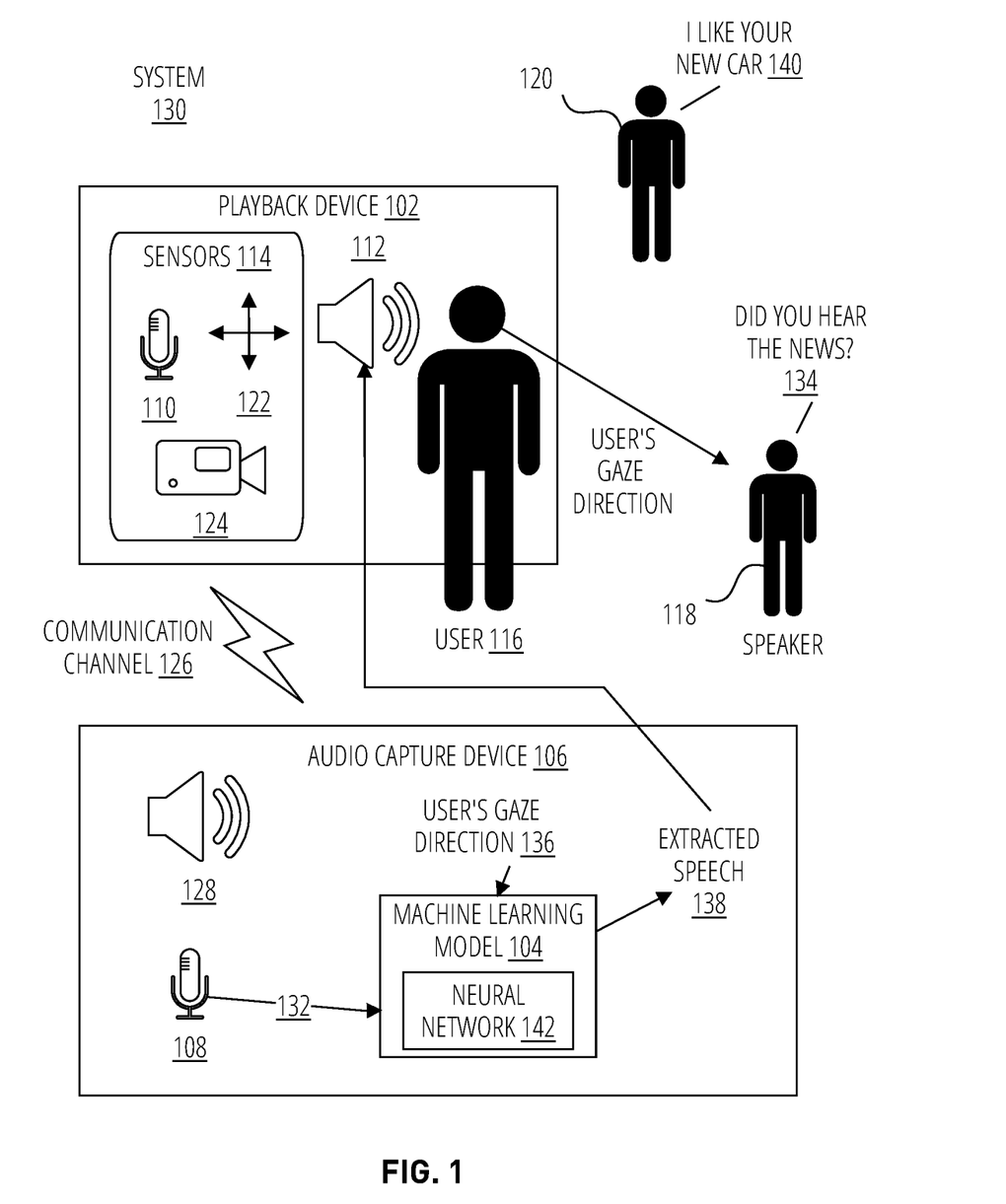
FIG. 1 shows a system for audio processing with gaze detection, according to some aspects.

FIG. 1 shows a system 130 for audio processing with gaze detection, according to some aspects. The system can include two or more devices such as a playback device 102 and an audio capture device 106. The playback device may output audio content to a user 116 through one or more speakers 112. The audio capture device 106 can be understood as a companion device that helps the playback device enhance the playback audio, as described.

An audio capture device 106 can be communicatively coupled to a playback device 102, over a communication channel 126. The audio capture device 106 and the playback device 102 may be separate devices that are physically unconnected, for example, they have separate housings. The communication channel 126 can be a wireless or wired connection supported by hardware such as, for example, a transmitter and receiver (or transceiver) on the playback device and the audio capture device. The devices can communicate with each other using one or more communication protocols such as, for example, Bluetooth, Wi-Fi, TCP/IP, or other communication protocol.

The playback device 102 may be a wearable playback device. For example, the playback device can be worn on the head of user 116. The playback device can include a headphone set that includes one or more speakers 112 (e.g., a left speaker and a right speaker). The speakers can be worn in-ear, on-ear, or over-ear of the user 116. In some aspects, the playback device includes a head mounted display which may be transparent (e.g., smart glasses) or opaque (e.g., a fully immersive virtual reality environment).

The audio capture device 106 can have a plurality of microphones 108 that sense sounds in the environment and generate a plurality of microphone signals characterize the sensed sounds. The audio capture device 106 or the playback device 102 can determine a gaze of the user 116 who is wearing the playback device. The gaze of the user can be understood as the direction in which the user's face is directed towards. For example, if user 116 is facing speaker 118, then the gaze direction 136 of user 116 is directed at speaker 118.

The gaze of the user 116 may be determined relative to the audio capture device 106 so that the audio capture device 106 can process microphone signals 132 to focus on detecting sound that may be present or originate at the user's gaze. In some examples, determining the gaze of the user includes emitting a pilot signal from the playback device 102 and receiving the pilot signal at the audio capture device 106 and/or emitting a pilot signal from the audio capture device 106 and receiving the pilot signal at the playback device 102. For example, the audio capture device can emit a pilot signal from one or more speakers 128 that can be sensed by microphones 110 of the playback device. Additionally, or alternatively, playback device 102 can emit a pilot signal that is sensed by microphones 108 of the audio capture device. The position and orientation of the playback device can be determined relative to the audio capture device, based on time difference of arrivals (TDOA) of the pilot signal sensed at two or more locations (e.g., at each microphone location) of the playback device and/or of the audio capture device. This position and orientation of the playback device that is relative to the audio capture device may be used as a proxy for the user's gaze direction 136 of the user. The pilot signal may include a sound, an electromagnetic signal, and/or other pilot signal that may be emitted by an audio transducer, a transmitter, and/or other pilot signal generator. The pilot signal may be an ultrasound signal such as 20 kHz or greater. In some aspects, the pilot signal may be an ultrasound signal 1 MHz or greater.

In some aspects, the playback device can include sensors such as, for example, microphones 110, an inertial measurement unit (IMU) 122 that can include an accelerometer and/or gyroscope, a camera 124, or other sensor. Each sensor can produce sensor information that can be used by the playback device to determine the user's head position. In some examples, the user's head position may be determined in a temporally relative sense such that the current head position is calculated relative to a previous calculation of the user's head position. In some examples, the user's head position may be determined in a temporally absolute sense, such that the user's head position is determined with disregard to the previous calculation of the user's head position. Such aspects may vary depending on the localization algorithm used. The playback device or the audio capture device may apply one or more localization algorithms to the sensor information such as, for example, visual odometry, an inertial based tracking algorithm, or other localization algorithm, to determine a user's head position. The user's head position and user's gaze direction 136 are discussed interchangeably in the present disclosure.

In some aspects, the audio capture device or the playback device may emit and/or sense the pilot signal to determine an initial position of the user's gaze direction 136 relative to the audio capture device 106. This can be understood as a calibration stage. Subsequent updates of the user's gaze 136 relative to the audio capture device can be determined using the sensor information from any of sensors 114 and an associated localization algorithm.

The audio capture device 106 can extract speech 134 that correlates to the gaze of the user, from the plurality of microphone signals 132 of the audio capture device by applying the plurality of microphone signals 132 and the gaze 136 of the user 116 to a machine learning model 104. The audio capture device 106 determines the gaze of the user relative to the audio capture device and its microphone array 108, so that the machine learning model can spatially filter sounds sensed by the microphone array 108 to emphasize a target sound (e.g., speech 134) that is present or originates from the user's gaze. This relative gaze can be determined or updated periodically, to accommodate for changes in the user's gaze direction. The user's gaze may be determined as spherical coordinates or as a line or vector in 2D or in 3D coordinates. The gaze may be determined using the audio capture device position as an origin. The gaze of the user relative to the audio capture device can be expressed in various formats and conventions without departing from the scope of the disclosure.

The audio capture device 106 can send the extracted speech 138 to the playback device 102 to be used by the playback device to convert to sound during playback to the user. The extracted speech can be embedded in one or more audio channels. In some examples, the audio channels can be spatialized, as described in other channels. The one or more audio channels containing the extracted speech can drive speakers 112 of the playback device to playback the extracted speech 138 to the user 116.

Depending on the gaze of the user, the audio capture device may use the machine learning model 104 to extract different speech from its microphone signals 132. The gaze of the user can be continuously determined to update the input to the machine learning model. For example, if the user 116 turns her gaze to another sound source such as speaker 120, then speech 140 may be extracted from the microphone signals, while speech 134 is ignored. In such a case, the extracted speech 138 may contain speech 140 instead of speech 134, although some trace amount of other sounds may still be present in the extracted speech 138.

The machine learning model may include an artificial neural network 142 that is trained to extract the speech from the plurality of microphone signals based on the gaze of the user. A neural network 142 may include a plurality of layers, each layer containing a plurality of nodes which can be understood as artificial neurons. The nodes of an input layer can receive the microphone signals and gaze as inputs. Each node can have an edge that connects the node to one or more nodes in a subsequent layer. Each edge can have a weight that determines the impact of the node towards the node of the subsequent layer that the node is connected to. Each layer of the neural network can have such nodes with such edges that connect to one or more nodes of subsequent layers. Each node can have an activation function that includes a weighted sum of the inputs to the node which determines if that node is activated or how activated that node is. An output layer of the neural network 142 can produce an extracted speech signal 138 for the given input microphone signals and gaze direction 136.

The machine learning model can be trained using a training dataset that include microphone signals and gaze detection as input and a corresponding desired output. For example, the training dataset may include a microphone signal that includes, as input, various sounds in an environment including speech and a gaze direction. The training dataset may include, as a desired output, a signal that has just the speech that originates in the gaze direction. These inputs and the desired output of the training dataset can be described as input-output pairs, and these pairs can be used to train the machine learning model in a process that may be understood as supervised training. The size of the training dataset can vary depending on application. The training dataset can vary in terms of sample size, numbers of gaze directions trained, number of microphone signals, and different tones and words used in the speech. Training an artificial neural network 142 can involve using an optimization algorithm to calculate the value of the weights to best map the given inputs (e.g., one or microphone signals, gaze direction, or other inputs described herein) to outputs (e.g., the extracted speech). For example, the training of the machine learning model can include using non-linear regression (e.g., least squares) to optimize a cost function to reduce error of the output of the machine learning model (as compared to the approved output of the training data). Errors (e.g., between the output and the approved output) are propagated back through the machine learning model, causing an adjustment of the weights which control the neural network algorithm. This process occurs repeatedly for each recording, to adjust the weights such that the errors are reduced. The same set of training data can be processed a plurality of times to refine the weights. The training can be completed once the errors are reduced to satisfy a threshold.

It should be understood that the training data can vary depending on the different aspects described herein. For example, if the inputs of the neural network are features, then the training data includes features extracted from the microphone signals to train the neural network as such. Similarly, if the user's gaze is represented by microphone signals containing a pilot signal, then the training data includes such microphone signals. Similarly, if the user's gaze is represented in terms of spherical coordinates or a vector, then the training data may also represent it as such. Different inputs and outputs of the neural network can be trained with datasets that correspond to those inputs and outputs. The training datasets can include microphone signals that are recorded using the same or similar microphone array as that of the audio capture device, so that machine learning model is trained with audio data that corresponds to the input microphone signals that the machine learning model is to receive when the machine learning model is used for speech extraction.

In some aspects, the user's gaze is determined by a position relative to the audio capture device and a direction starting from that position. For example, the audio capture device 106 can be treated as an origin of a three-dimensional coordinate system such as 0, 0, 0 along the X, Y, and Z axis. The user's gaze may start at coordinates 'a', 'b', and 'c', in the three dimensional coordinate system, and have spherical coordinates or a three-dimensional line from that position. Spherical coordinates can be represented by an azimuth and elevation. A three-dimensional line can be represented by a starting point 'a', 'b', and 'c', and an ending point 'e', 'f', and 'g'.

In some aspects, the neural network may determine the gaze of the user as well as extract the speech. The neural network may take the microphone signals that contain the pilot signal sensed by microphones 108 and/or 110 as inputs. The neural network may also take in the microphone signals 132 and then determine the extracted speech 138 based on those inputs. In such a case, the neural network may be trained with a training dataset that has the corresponding inputs (microphone signals with a pilot signal and microphone signals with speech for extraction) and desired output (the desired speech). This can eliminate additional processing blocks to determine the user's gaze, but place more effort up front to gather and organize the appropriate training dataset.

In some embodiments, the neural network further extracts non-speech sounds using the plurality of microphone signals and the gaze of the user as input. For example, the neural network can be trained to extract background sounds such as music, rain, or other background sounds. This sound can be mixed back into the output playback channels, as described in other sections.

Figure 2:
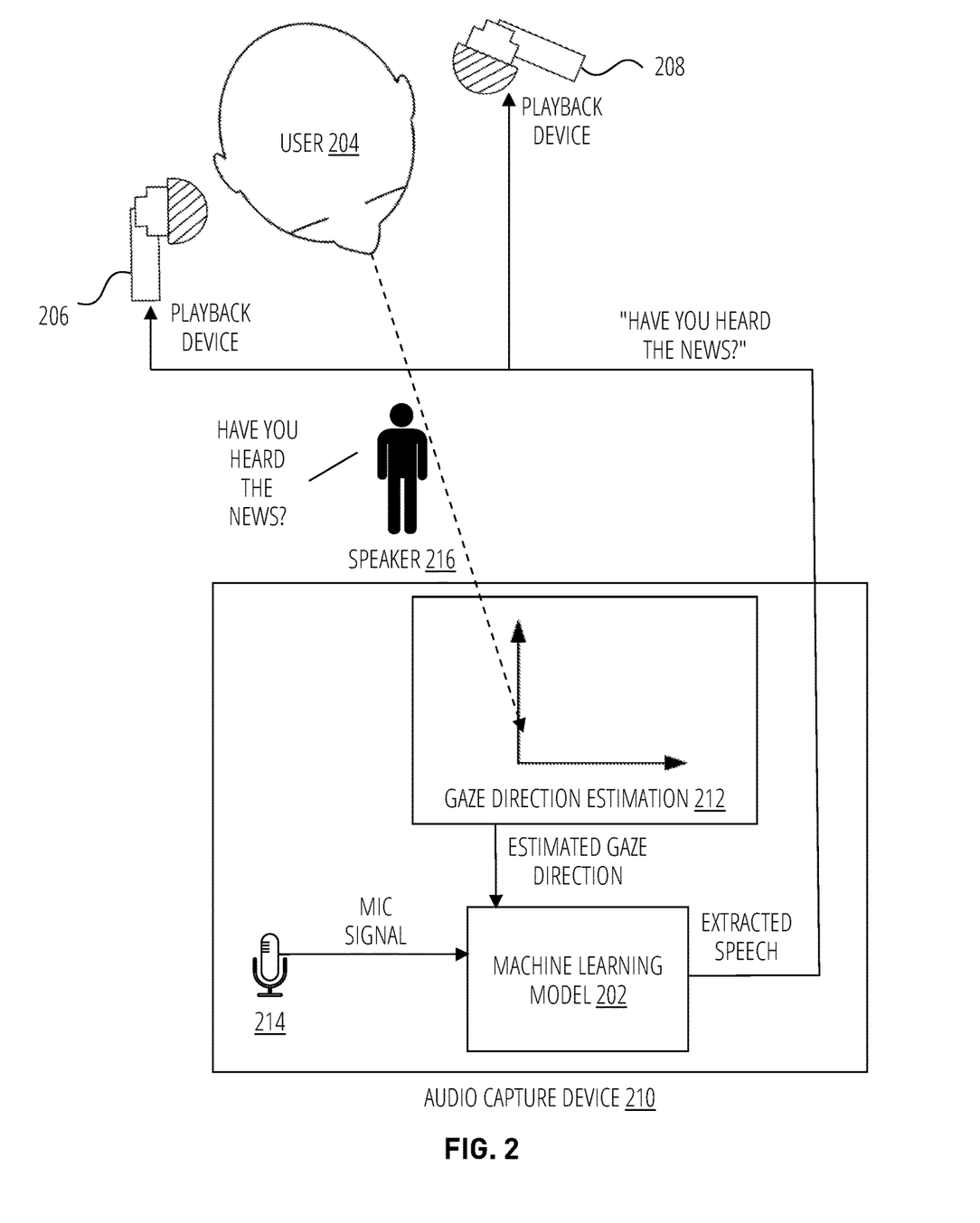
FIG. 2 shows a workflow of an audio capture device that extracts speech based on a user's gaze, according to some aspects.

FIG. 2 shows a workflow of an audio capture device 210 for extracting speech, according to some aspects. A user 204 may wear a playback device, which may include left ear piece 208 and right ear piece 206 that can be worn in-ear, on-ear, or over-ear. Each ear piece can include a loudspeaker that converts an audio channel to audible sound. In some examples, the playback device may include a single ear piece or speaker. The playback device 208, 206 may be physically separate from audio capture device 210.

The audio capture device 210 may generate a plurality of microphone signals from a plurality of microphones 214 of the audio capture device. The microphones 214 may form a microphone array with known and fixed position of each microphone.

At gaze direction estimation block 212, the audio capture device may determine a gaze of a user who is wearing a playback device (206, 208) that is separate from the audio capture device, the gaze of the user being determined relative to the audio capture device 210. One or more localization algorithms can be applied to sensor information, such as, for example, a TDOA-based algorithm, visual odometry, simultaneous localization and mapping (SLAM), an inertial-based localization, and/or other localization algorithm. The sensor information can be gathered by sensors on the playback device and/or sensors on the audio capture device.

The audio capture device 210 can extract speech that correlates to the gaze of the user, from the plurality of microphone signals of the audio capture device by applying the plurality of microphone signals of the audio capture device and the gaze of the user to a machine learning model 202.

The audio capture device 210 can send the extracted speech to the playback device for playback. As such, the system can utilize microphones of an audio capture device, which may be unattached to the user, to emphasize speech or other sounds that are present in the user's gaze direction.

Figure 3:
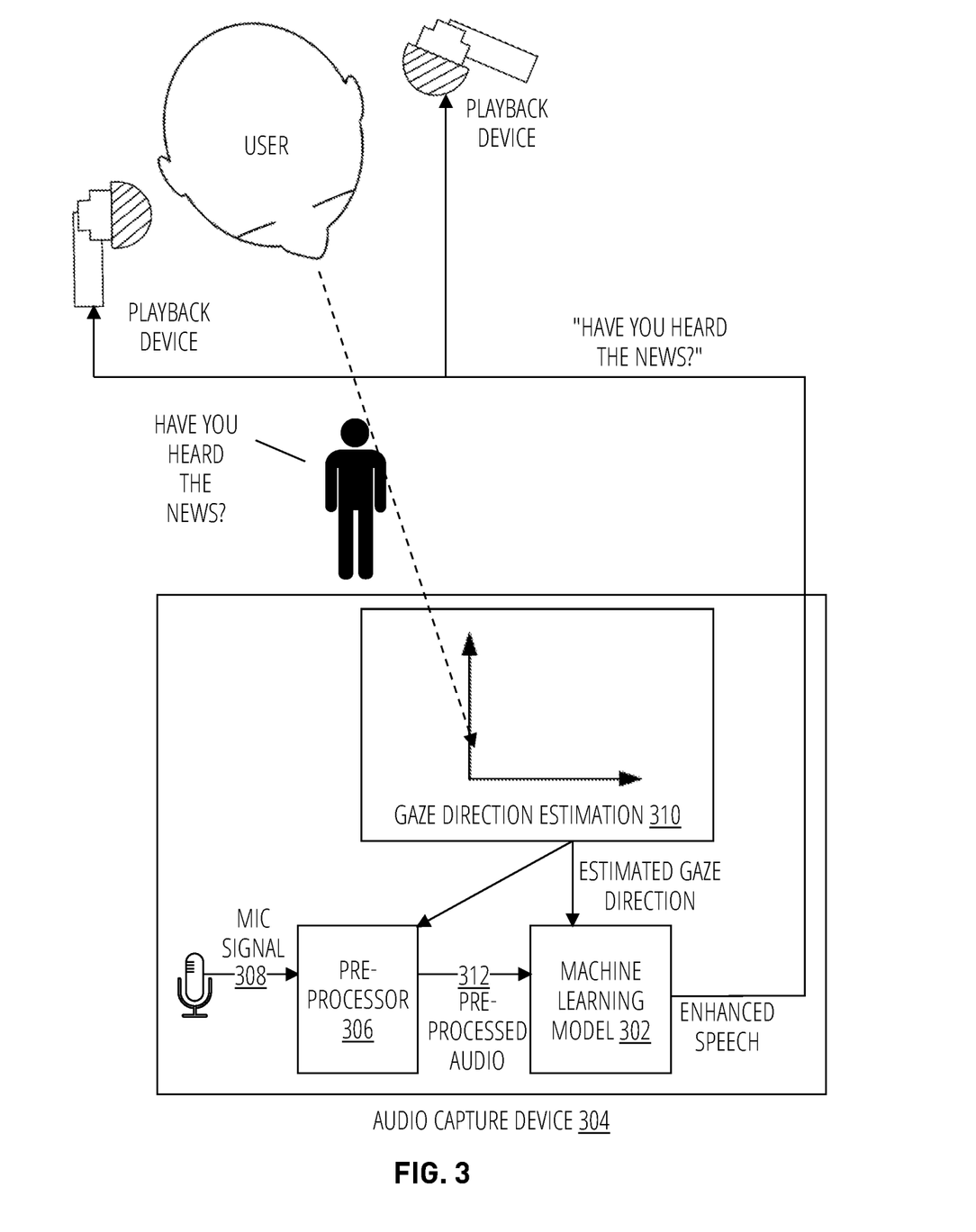
FIG. 3 shows a workflow of an audio capture device that extracts speech with preprocessing of a microphone signal, according to some aspects.

FIG. 3 shows a workflow of an audio capture device 304 for extracting speech with preprocessing of a microphone signal, according to some aspects. The microphone signals of the audio capture device can be processed to improve the performance of the machine learning model.

In some aspects, pre-processing block 306 can include a beamformer that generates a beamformed microphone pickup signal. The pre-processing block can apply beamforming spatial filters (frequency dependent gains and/or phase shifts) to the microphone signals 308 to create constructive and destructive interference at different directions relative to the microphones of the audio capture device 304. The spatial filters can be selected to emphasize sounds at the gaze direction determined at block 310. The resulting beamformed microphone signal 312 can be used as input to machine learning model 302, along with the gaze direction of the user. As such, pre-processing can provide an input to the machine learning model that is already focused at the gaze direction of the user, so that the machine learning model can better extract the speech at the focused region.

In some examples, the pre-processing block 306 can include a feature extractor. The pre-processing block 306 can analyze the microphone signals in the frequency domain to extract audio features from the microphone signals. Features are generalized variables or attributes generated based on data, such as the audio data represented in the plurality of microphone signals. Different feature extraction processes can be employed at block 306 to extract features, for example, linear predictive coding, Mel-frequency cepstrum, RASTA filtering, probabilistic linear discriminate analysis, or other feature extraction processes. The resulting one or more feature vectors 312 can be used as input to the machine learning model, along with the gaze direction of the user. Corresponding feature engineering algorithms and processes can be used to enhance the training datasets for the machine learning model. Such pre-processing can improve performance of the machine learning model by compressing the overall data in the microphone signals 308 to that which is useful to the machine learning model.

Figure 4:
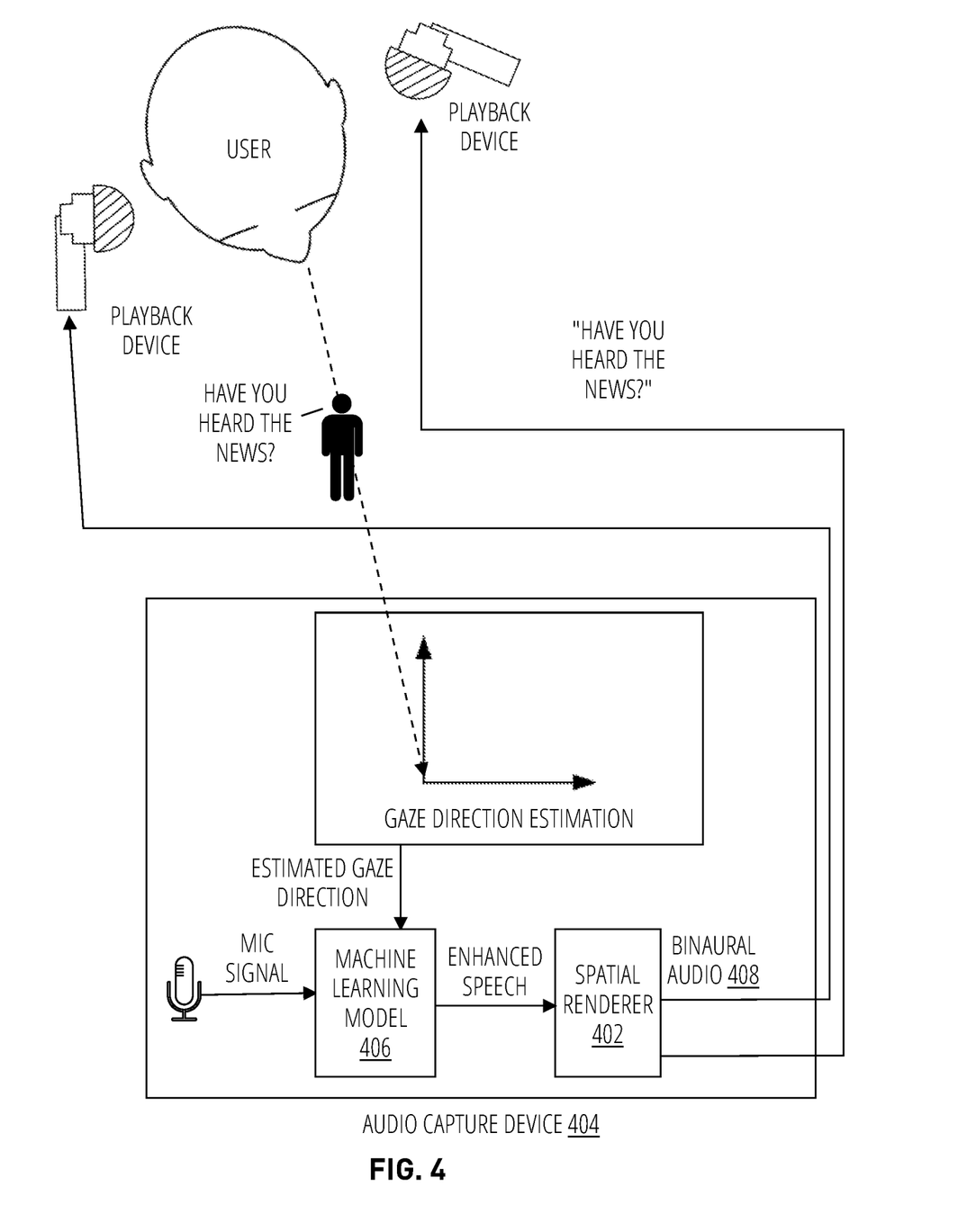
FIG. 4 shows a workflow of an audio capture device that extracts speech and performs binaural audio rendering, according to some aspects.

FIG. 4 shows a workflow of an audio capture device 404 for extracting speech with binaural audio rendering, according to some aspects. The audio capture device 404 may include a spatial renderer 402.

At block 402, the audio capture device 404 may spatially render the speech with spatial filters to generate binaural audio channels 408. The binaural audio channels may be sent to the playback device to drive a left and a right speaker of the playback device.

Humans can estimate the location of a sound by analyzing the sounds at their two ears. This is known as binaural hearing and the human auditory system can estimate directions of sound using the way sound diffracts around and reflects off of our bodies and interacts with our pinna. These spatial cues can be artificially generated by applying spatial filters to audio signals. The spatial filters can be understood a head related impulse response (HRIR) or a head related transfer function (HRTF) depending on if the filter is applied in the time domain or the frequency domain. The spatial filters can artificially impart spatial cues that resemble the diffractions, delays, and reflections that are naturally caused by our body geometry and pinna, such that the sound is to be perceived to have spatial qualities originating from a location outside of the listener's head, for example, in front of, above, below, or to the side of the listener. The spatial renderer 402 can apply spatial filters by convolving the output of the machine learning model 406 with the spatial filters to generate binaural audio 408.

In some aspects, spatial filters of the spatial renderer 402 may be generated based on audio captured by the playback device. The playback device may have one or more microphones located at the left ear of a wearer and second one or more microphones located at a right ear of the wearer. The microphone signals generated by the microphones located at the left ear and located at the right ear can be analyzed by the playback device or the audio capture device to determine interaural channel differences, interaural cross-coherence (IACC), interaural time differences, and/or other interaural differences, which may vary from one frequency to another. These interaural differences can be embedded into the spatial filters so that the spatial filters more accurately characterize the user's unique head geometry. This can improve the intelligibility of the playback speech and provide an improved spatial experience.

Figure 5:
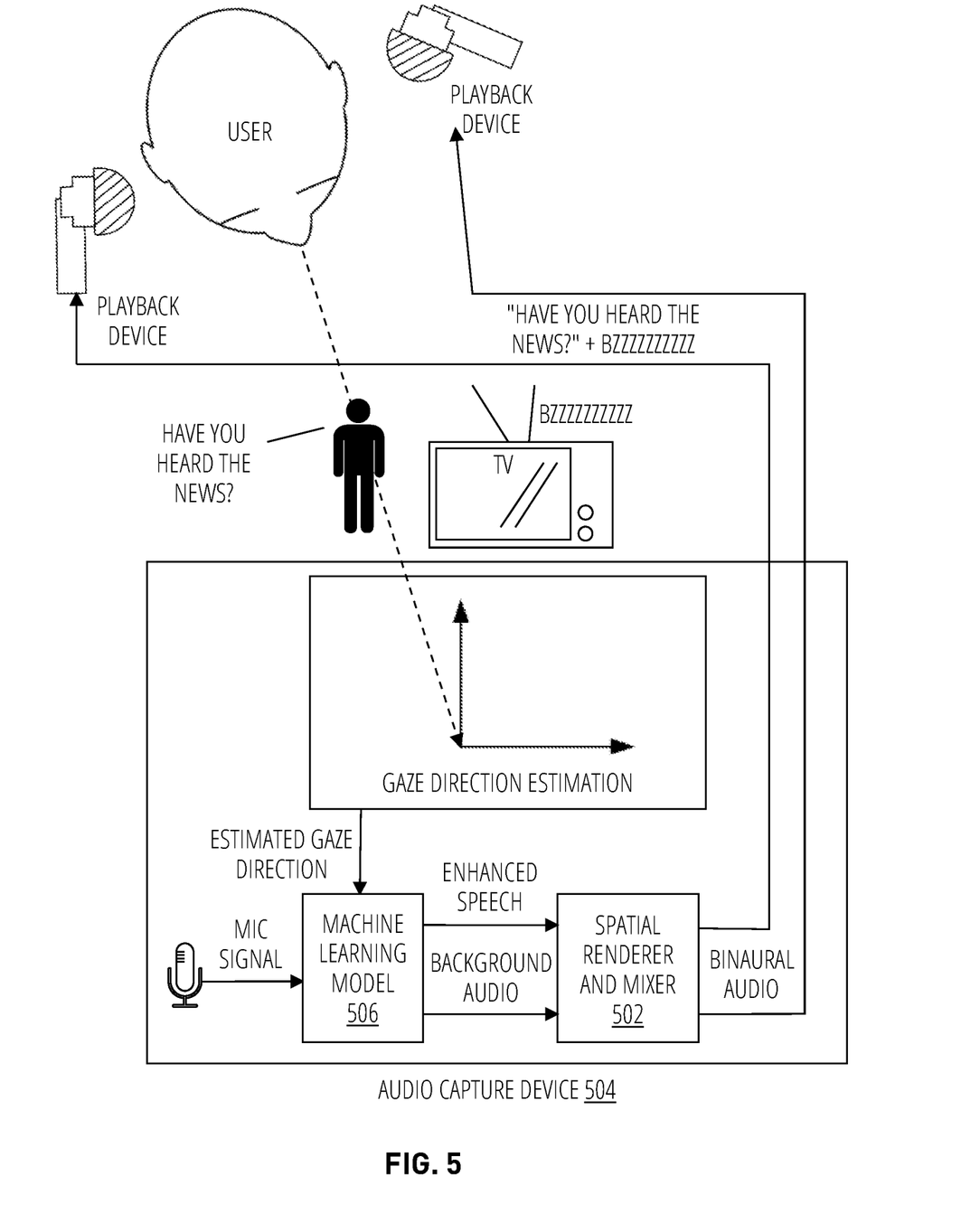
FIG. 5 shows a workflow of an audio capture device that extracts speech and background sound, according to some aspects.

FIG. 5 shows a workflow of an audio capture device 504 for extracting speech and background sound with binaural audio rendering, according to some aspects. An audio capture device 504 may use a machine learning model 506 that is trained to extract speech and background sounds that may be present in the direction of the user's gaze.

Background sounds, such as music, a television, a humming engine, rain, or other non-speech sound, can be extracted by machine learning model 506 in view of the user's gaze. The background sounds can be mixed back in with the enhanced speech at block 502. In some aspects, the strength of the background sounds can be reduced and/or the strength of the speech can be increased in the mixing process. The combined audio can be spatially filtered at block 502 to produce binaural audio that can be sent to the playback device for playback.

It should be understood that aspects described with respect to some figures can be included with aspects described in other figures. Further, some of the operations can be distributed among the playback device and the audio capture device. For example, in some aspects, the operations of the machine learning model, spatial rendering, and/or mixing can be performed by the playback device.

Figure 6:
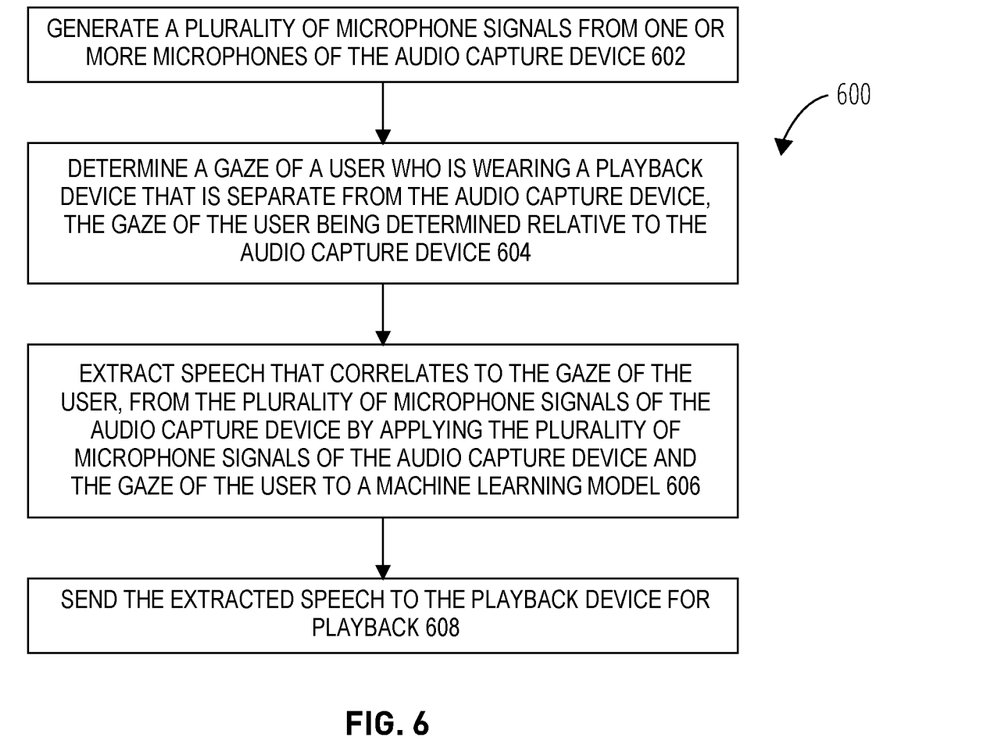
FIG. 6 shows a method for extracting speech based on a user's gaze, according to some aspects.

FIG. 6 shows a method 600 for extracting speech based on a user's gaze, according to some aspects. The method 600 can be performed with various aspects described. The method may be performed by hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof, which can be referred to as processing logic. Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

At block 602, processing logic generates a plurality of microphone signals from a plurality of microphones of the audio capture device. At block 604, processing logic determines a gaze of a user who is wearing a playback device that is separate from the audio capture device, the gaze of the user being determined relative to the audio capture device. At block 606, processing logic extracts speech that correlates to the gaze of the user, from the plurality of microphone signals of the audio capture device by applying the plurality of microphone signals of the audio capture device and the gaze of the user to a machine learning model. At block 608, processing logic sends the extracted speech to the playback device for playback.

Figure 7:
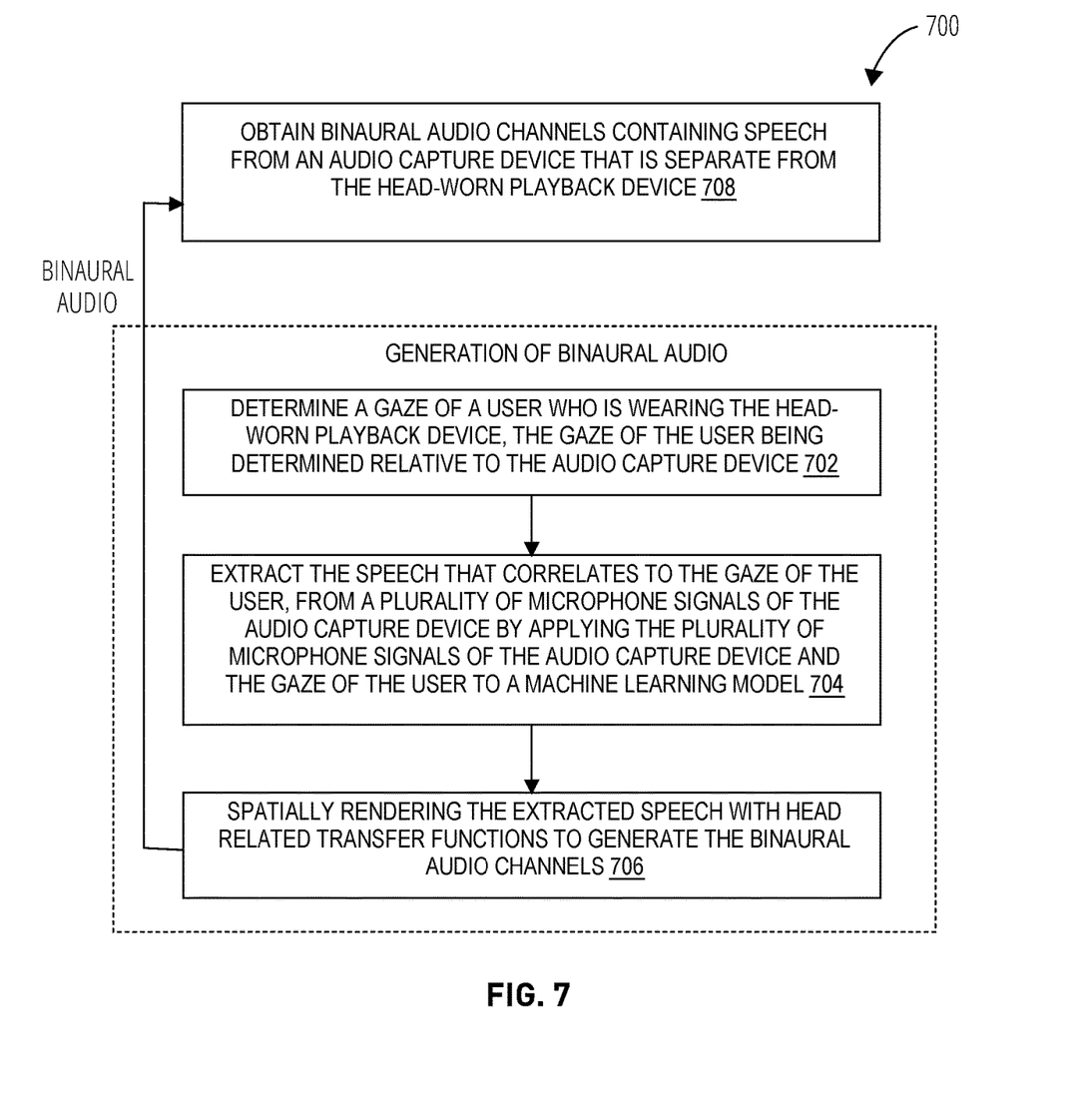
FIG. 7 shows a method for obtaining audio for playback, according to some aspects.

FIG. 7 shows a method 700 for obtaining audio for playback, according to some aspects. The method 700 can be performed with various aspects described. The method may be performed by hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof, which can be referred to as processing logic. Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

At block 702, processing logic obtains binaural audio channels containing speech from an audio capture device that is separate from the head-worn playback device. The binaural audio channels are generated at blocks 704, 706, and 708.

At block 704, processing logic determines a gaze of a user who is wearing the head-worn playback device, the gaze of the user being determined relative to the audio capture device. At block 706, processing logic extracts the speech that correlates to the gaze of the user, from a plurality of microphone signals of the audio capture device by applying the a plurality of microphone signals of the audio capture device and the gaze of the user to a machine learning model. At block 708, processing logic spatially renders the extracted speech with head related transfer functions to generate the binaural audio channels.

In some aspects, the method 700 is performed by an electronic device such as, for example, a playback device as described in other sections. Blocks 702, 704, 706, and 708 may be distributed between the playback device and the audio capture device. For example, the playback device can perform any one or more of blocks 702, 704, 706, and 708, while the audio capture device performs the remaining operations. If the playback device performs the machine learning algorithm, then the playback device can obtain the microphone signals generated by the audio capture device. In some aspects, blocks 704, 706, and 708 may be performed by another device other than the playback device and the audio capture device. This third device can act as an audio processing server for various electronic devices. Electronic devices can communicate over a communication network such as, for example, Wi-Fi, TCP/IP, or other communication network. In some aspects, the playback device (e.g., a headphone set) can have a processor configured to perform some or all of the blocks of method 700. For example, the processor of the playback device can be configured to obtain gaze information (such as at block 702) and use that information to extract speech from microphone signals of the audio capture device (such as at block 704) and generate binaural audio channels (such as at block 706).

Figure 8:
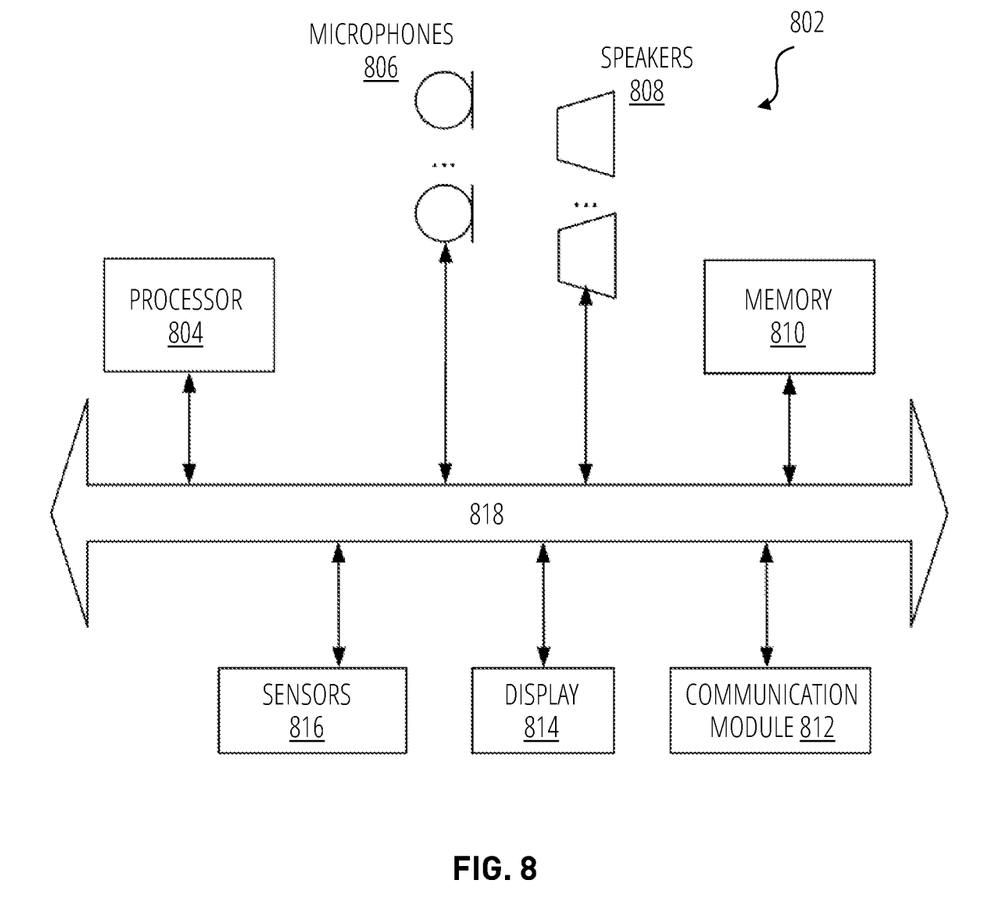
FIG. 8 illustrates an audio processing system, according to some aspects.

FIG. 8 illustrates an example of an audio processing system 802, in accordance with some aspects. The audio processing system can be an electronic device such as, for example, a desktop computer, a tablet computer, a smart phone, a computer laptop, a smart speaker, a media player, a household appliance, an in-ear, on-ear, or over-ear headphone set, a head mounted display (HMD), smart glasses, an infotainment system for an automobile or other vehicle, or other computing device. The system can be configured to perform the method and processes described in the present disclosure.

Although various components of an audio processing system are shown that may be incorporated into headphones, speaker systems, microphone arrays and entertainment systems, this illustration is merely one example of a particular implementation of the types of components that may be present in the audio processing system. This example is not intended to represent any particular architecture or manner of interconnecting the components as such details are not germane to the aspects herein. It will also be appreciated that other types of audio processing systems that have fewer or more components than shown can also be used. Accordingly, the processes described herein are not limited to use with the hardware and software shown.

The audio processing system can include one or more buses 818 that serve to interconnect the various components of the system. One or more processors 804 are coupled to bus as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 810 can include Read Only Memory (ROM), volatile memory, and non-volatile memory, or combinations thereof, coupled to the bus using techniques known in the art. Sensors 816 can include an IMU and/or one or more cameras (e.g., RGB camera, RGBD camera, depth camera, etc.) or other sensors described herein. The audio processing system can further include a display 814 (e.g., an HMD, or touch-screen display).

Memory 810 can be connected to the bus and can include DRAM, a hard disk drive or a flash memory or a magnetic optical drive or magnetic memory or an optical drive or other types of memory systems that maintain data even after power is removed from the system. In one aspect, the processor 804 retrieves computer program instructions stored in a machine readable storage medium (memory) and executes those instructions to perform operations described herein.

Audio hardware, although not shown, can be coupled to the one or more buses in order to receive audio signals to be processed and output by speakers 808. Audio hardware can include digital to analog and/or analog to digital converters. Audio hardware can also include audio amplifiers and filters. The audio hardware can also interface with microphones 806 (e.g., microphone arrays) to receive audio signals (whether analog or digital), digitize them when appropriate, and communicate the signals to the bus.

Communication module 812 can communicate with remote devices and networks through a wired or wireless interface. For example, communication module can communicate over known technologies such as TCP/IP, Ethernet, Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses can be connected to each other through various bridges, controllers and/or adapters as is well known in the art. In one aspect, one or more network device(s) can be coupled to the bus. The network device(s) can be wired network devices (e.g., Ethernet) or wireless network devices (e.g., Wi-Fi, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms 'module', 'processor', 'unit', 'renderer', 'system', 'device', 'filter', 'reverberator', 'block', 'tracker', 'simulation', 'model', and 'component', are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as desired, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 612(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method performed by at least one processor of an audio capture device, comprising:
receiving, by the at least one processor, a plurality of microphone signals from a plurality of microphones that are at different locations of the audio capture device, at least two microphone signals comprising a pilot signal produced by a transducer of a playback device that is separate from the audio capture device;
determining, by the at least one processor, a gaze of a user who is wearing the playback device, the gaze of the user being determined relative to the audio capture device and based on a time difference of arrivals of the pilot signal based on the at least two microphone signals;

extracting, by the at least one processor, speech that correlates to the gaze of the user, from the plurality of microphone signals, by applying the plurality of microphone signals and the gaze of the user to a machine learning model; and causing, by the at least one processor, the audio capture device to send the extracted speech to the playback device for playback.

2. The method of claim 1, further comprising spatially rendering the speech with spatial filters to generate binaural audio channels, and sending the speech to the playback device includes sending the binaural audio channels to the playback device to drive a left and a right speaker of the playback device.

3. The method of claim 2, wherein the spatial filters are generated based on audio captured by the playback device.

4. The method of claim 1 further comprising:
extracting a non-speech sound in view of the gaze of the user, from at least one microphone signal of the plurality of microphone signals, by applying the plurality of microphone signals and the gaze of the user to the machine learning model;
processing the extracted speech;
mixing the processed extracted speech with the extracted non-speech sound; and
transmitting, over a wireless network, the mix to the playback device for playback.

5. The method of claim 1, wherein determining the gaze of the user includes applying a localization algorithm to sensor information from a camera or an inertial measurement unit (IMU) of the playback device, to determine the gaze of the user.

6. The method of claim 1, wherein the machine learning model includes a neural network that is trained to extract the speech from the plurality of microphone signals based on the gaze of the user.

7. The method of claim 6, wherein determining the gaze of the user and applying the gaze of the user to the neural network are performed by applying the pilot signal sensed by the at least two of the plurality of microphones to the neural network.

8. The method of claim 6, wherein the neural network is trained to further extract non-speech sounds using the plurality of microphone signals and the gaze of the user as input.

9. The method of claim 1, wherein the playback device includes a headphone set that includes a microphone array, a left speaker and a right speaker that are each worn in-ear, on-ear, or over-ear of the user.

10. The method of claim 9, wherein the playback device includes a head-mounted display.

11. The method of claim 1, wherein the pilot signal comprises an audible sound or an ultrasound.

12. A method performed by at least one processor of a head-worn playback device, the method comprising:
receiving, by the at least one processor, a plurality of microphone signals from a plurality of microphones that are at different locations of the head-worn playback device, at least two microphone signals comprise a pilot signal produced by a transducer of an electronic device that is separate from the head-worn playback device;
determining, by the at least one processor, a gaze of a user who is wearing the head-worn playback device, the gaze of the user being determined relative to the electronic device and based on a time difference of arrivals of the pilot signal based on the at least two microphone signals;

extracting, by the at least one processor, speech that correlates to the gaze of the user, from the plurality of microphone signals by applying the plurality of microphone signals and the gaze of the user to a machine learning model; and spatially rendering, by the at least one processor, the extracted speech with head related transfer functions to generate binaural audio channels.

13. The method of claim 12, wherein the head related transfer functions are generated based on processing second microphone signals of the head-worn playback device to gather interaural differences of the user.

14. The method of claim 12, wherein the head-worn playback device comprises a first microphone and a second microphone, each of the microphones being at a different location of the head-worn playback device, wherein the time difference of arrivals is determined based on the pilot signal being sensed by the first microphone and the pilot signal being sensed by the second microphone.

15. The method of claim 12, wherein the head-worn playback device includes a headphone set that includes a left speaker and a right speaker that are each worn in-ear, on-ear, or over-ear of the user, and a microphone array.

16. The method of claim 12, wherein the head-worn playback device includes a head mounted display.

17. An audio processing device comprising:
one or more processors;
a plurality of microphones, each at a different location on the audio processing device; and
memory having instructions which when executed by the one or more processors causes the audio processing device to:
generate a plurality of microphone signals from the plurality of microphones;
determine a gaze of a user who is wearing a playback device that is separate from the audio processing device, the gaze of the user being determined relative to the audio processing device, wherein the gaze of the user is determined by:
receiving a pilot signal produced by a speaker of the playback device in at least two of the plurality of microphone signals, and
determining a time difference of arrivals of the pilot signal based on sensing the pilot signal at two or more locations of the audio processing device;
extract speech that correlates to the gaze of the user, from the plurality of microphone signals by applying the plurality of microphone signals and the gaze of the user to a machine learning model; and
cause the audio processing device to send the extracted speech to the playback device for playback.

18. The audio processing device of claim 17, wherein the one or more processors are further configured to spatially render the speech with head related transfer functions to generate binaural audio channels, and wherein to send the speech to the playback device includes sending the binaural audio channels to the playback device to drive a left and a right speaker of the playback device.

19. The audio processing device of claim 18, wherein the head related transfer functions are generated based on processing microphone signals of the playback device to gather interaural differences of the user.

20. The audio processing device of claim 17, wherein the plurality of microphones comprises a first microphone and a second microphone, each microphone being at a different location of the two or more locations of the audio processing device, wherein the time difference of arrivals is determined based on the pilot signal being sensed by the first and second microphone.

\* \* \* \* \*